(No Model.)
C. P. SIMPSON & S. WILSON.
COOKING UTENSIL.
No. 286,082.        Patented Oct. 2, 1883.
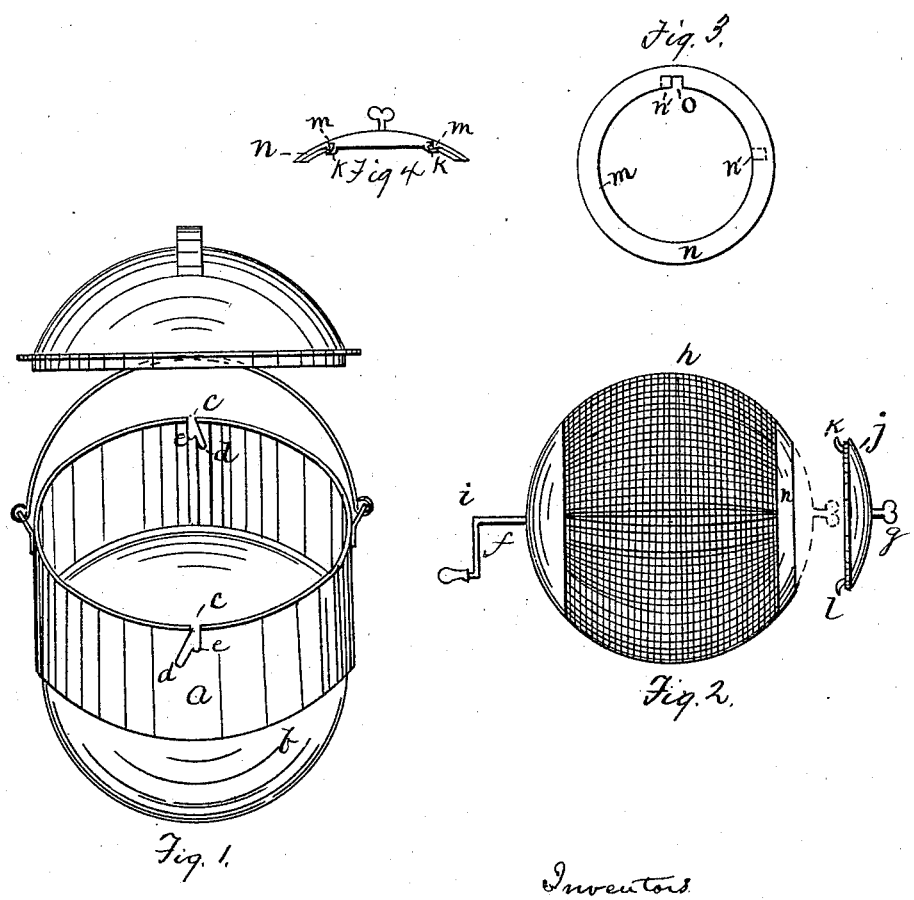

UNITED STATES PATENT OFFICE.

CHARLES P. SIMPSON AND STANISLAUS WILSON, OF SULLIVAN, MAINE.

COOKING-UTENSIL.

SPECIFICATION forming part of Letters Patent No. 286,082, dated October 2, 1883.

Application filed February 16, 1883. (No model.)

*To all whom it may concern:*

Be it known that we, CHARLES P. SIMPSON and STANISLAUS WILSON, both of Sullivan, in the county of Hancock and State of Maine, have invented certain new and useful Improvements in Cooking-Utensils; and we do hereby declare that the following is a full, clear, and exact description of the invention, that will enable others skilled in the art to which it appertains to make and use the same, reference being had to the accompanying drawings, forming a part of this specification, in which—

Figure 1 shows an isometrical perspective of kettle and view of cover, the latter elevated; Fig. 2, a side view of receiver, its cover being slightly removed; Fig. 3, top view of collar $n$, stops in dotted lines; Fig. 4, section of same.

Same letters show like parts.

Our invention consists of an improved cooking-utensil, particularly adapted to the roasting of coffee and similar work, but which will probably be found useful for other purposes. It will be understood by reference to the annexed drawings.

At $a$ is shown a kettle or pot fitting over the stove-hole, as usual, but provided with a hemispherically-shaped bottom, $b$.

At $c\ c$, on each side, are slots adapted to receive and hold at different heights, $d\ e$, journals $f\ g$, secured to and forming journals for a substantially-spherical receiver, $h$, fitting easily into the kettle $a$. When the journals are set in the lower bearings, $d$, the receiver or globe just clears the bottom of the kettle. When in the upper bearing, $e$, it is somewhat raised therefrom—say three-quarters of an inch, or thereabout—but can be readily revolved in either position by means of the attached crank $i$.

The ends of the receiver $h$ are preferably of cast-iron, the one to which the crank $i$ is attached being cast whole, and provided with an internal ring secured by countersunk screws (or with some equivalent devices) for securing the wires, wire gauze or netting forming the central portion of the receiver. The opposite end has similar devices for this purpose, and its central portion forms a cover, $j$, for inserting or removing the article to be cooked. This cover rests on a slight flange, and is provided with lips $k\ l$, one hooking under a rim, $m$, on the collar part $n$ of the end or head, and the other passing into a slot or nick, $o$, in said rim. It is evident that when the cover is on a partial turn—which should be to the right, so that the revolution of the receiver shall tend to keep it in place—will bring both lips under the rim. Stops $n'\ n'$ are provided, if desired, to prevent a turn in the wrong direction and to check it in extent. The journal $g$ forms a handle for the cover. The wires forming the central portion of the receiver, as shown, may be arranged in any desired manner, either reticulated or otherwise, care being taken that the interstices shall not be so wide as to permit the escape of the article to be prepared, or so narrow as to interfere with watching the progress of the process. The cover of the kettle $a$ is hemispherical—or partakes of that shape—to conform to the shape of the receiver.

We do not confine ourselves strictly to the spherical form of kettle and receiver. We have spoken of it as a form generally convenient; but it is evident that without changing our principle a cylindrical vessel could be made to fit the openings in a stove when both the end holes and dividing-partitions were removed, the other features being substantially the same. This we should consider as our invention, though it does not appear to be such as requires particular description, what we have already described appearing to sufficiently describe the whole.

Having described our invention fully, it seems needless to describe the manner of using it, which will readily suggest itself to any one.

What we claim as our invention, and desire to secure by Letters Patent, is—

In a cooking-utensil, the combination of the revolving receiver $h$, constructed partially of wire, as described, and provided with the cover $j$, journals $f\ g$, and crank $i$, with the outer kettle, $a$, having two slots, $d\ e$, adapted to support said journals and receiver at different heights, said outer kettle entirely inclosing said receiver, conforming to it in shape, and protecting its contents from the direct action of the fire, as set forth and shown.

In testimony that we claim the foregoing we have hereunto set our hands this 2d day of February, 1883.

CHARLES P. SIMPSON.
   STANISLAUS WILSON.

Witnesses:
 WILLIAM O. EMERY,
 CHARLES H. PREBLE.